United States Patent [19]

Wolf et al.

[11] 3,928,590
[45] Dec. 23, 1975

[54] ORTHO-MERCAPTOAROYLAMIDES AND SALTS THEREOF AS HYPOGLYCEMIC AGENTS

[75] Inventors: Milton Wolf, West Chester; John H. Sellstedt, Pottstown; Richard L. Fenichel, Wyncote, all of Pa.

[73] Assignee: American Home Products Corporation, New York, N.Y.

[22] Filed: June 6, 1974

[21] Appl. No.: 477,121

Related U.S. Application Data

[62] Division of Ser. No. 232,250, March 6, 1972, Pat. No. 3,853,876.

[52] U.S. Cl. ............... 424/245; 242/244; 424/250; 424/267; 424/274
[51] Int. Cl.² ........................................ A61K 27/00
[58] Field of Search ............ 424/274, 267, 250, 245

[56] References Cited
UNITED STATES PATENTS

| 3,635,976 | 4/1972 | Shetty | 260/268 |
| 3,654,296 | 4/1972 | Bolhofer | 260/268 |

Primary Examiner—Frederick E. Waddell
Attorney, Agent, or Firm—Richard K. Jackson

[57] ABSTRACT

Ortho-mercaptoaroylamides and pharmaceutically acceptable salts thereof exhibit hypoglycemic activity in warm-blooded animals. The compounds may be prepared directly by the reaction of a secondary amine with a 2-imino-1,3-benzothiazin-4-one or indirectly by the reaction of the desired amine with (o-chlorocarbonylphenyl) dithioether followed by reduction of the disulfide linkage.

10 Claims, No Drawings

ORTHO-MERCAPTOAROYLAMIDES AND SALTS THEREOF AS HYPOGLYCEMIC AGENTS

RELATED APPLICATIONS

This application is a division of copending application Ser. No. 232,250 filed Mar. 6, 1972 by Milton Wolf, John H. Sellstedt and Richard L. Fenichel now U.S. Pat. No. 3,853,876, granted Dec. 10, 1974.

BACKGROUND OF THE INVENTION

In the past, various substituted phenylsulfonyl ureas, substituted biguandies and insulin derivatives have been employed as hypoglycemic agents, U.S. Pat. No. 2,538,018; 2,961,377; 2,968,158; 3,041,331 and 3,349,124.

BRIEF DESCRIPTION OF THE INVENTION

It has now been found that certain ortho-mercaptobenzoic acid amides and their pharmaceutically acceptable salts reduce the blood sugar level in warm-blooded animals.

Thus, in accordance with this invention there is provided certain novel hypoglycemic agents possessing the orthomercaptobenzoic acid amide structure in which the amine moiety is a 1-azacycloalkyl radical containing from 3 to 7 carbon atoms, and pharmaceutically acceptable salts thereof. In addition, there is provided pharmaceutical compositions containing as an active ingredient, the ortho-mercaptobenzoic acid amides of this invention.

Furthermore, in accordance with this invention, there is provided processes for the production of the hypoglycemic agents and for their administration to a hyperglycemic warm-blooded animal.

DETAILED DESCRIPTION OF THE INVENTION

The compounds of this invention are generically definable as N-polymethylene-mercaptoaroylamides of the formula:

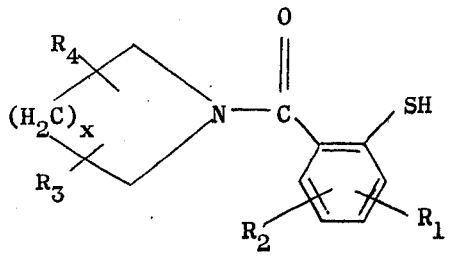

in which
R$_1$ and R$_2$ are independently —H, lower alkyl, aryl of 6 to 10 carbon atoms, (lower)alkoxyaryl of 7 to 11 carbon atoms, m-trifluoromethylaryl of 7 to 11 carbon atoms, an azacarbocyclic aromatic radical of 5 to 9 carbon atoms, —OH, —SH, lower alkoxy, lower alkylthio, lower alkylsulfonyl, —CF$_3$, —F, —Cl, —Br, —I, —NO$_2$, —SCN, di(lower)alkylamino, CONH$_2$, —SO$_2$NH$_2$, carboxy(lower)alkyl, carboxy, (lower)alkanoylamido, or when taken together, the ortho-fused 1,3-butadienylene radical;
R$_3$ and R$_4$ are independently selected from the group consisting of —H, lower alkyl, lower alkoxy, aryl of 6 to 10 carbon atoms, (lower)alkoxyaryl of 7 to 11 carbon atoms, aralkyl of 7 to 11 carbon atoms, azacycloalkyl of 4 to 6 carbon atoms, an azacarbocyclic aromatic radical of 5 to 9 carbon atoms, —CF$_3$, —F, —Cl, —Br and I; $x$ is an integer from 1 to 5; and
the pharmaceutically acceptable salts thereof.

A preferred group of compounds from the standpoint of economics and availability of the necessary starting materials are those of the formula:

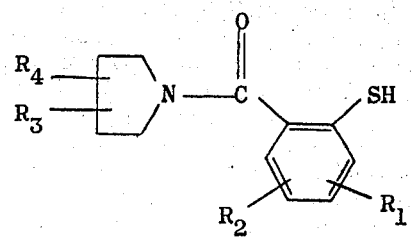

in which
R$_1$, R$_2$, R$_3$ and R$_4$ are independently selected from the group consisting of —H, lower alkyl, lower alkoxy, halo, —NO$_2$, —NH$_2$, di(lower)alkylamino, —OH, —SH and lower alkylthio; and
physiologically acceptable salts thereof.

In the preceding paragraphs, the expression "lower", employed to modify alkyl, alkoxy, and the like, is used to denote groups derived from the alkane series which contain from 1 to about 6 carbon atoms. The expressions azacycloalkyl and azacarbocyclic aromatic are used to define monovalent radicals containing one nitrogen atom, the valence bond of the radical belonging to a carbon atom or the 1-aza nitrogen atom as indicated. The expression pharmaceutically acceptable salts thereof, is intended to embrace the salts formed with alkali metal cations e.g. Na$^+$, K$^+$, Rb$^+$ and Cs$^+$; the alkaline earth cations e.g. Ca$^{++}$, Mg$^{++}$, Sr$^{++}$; and the transition metal cations such as Zn$^{++}$. In addition to the common metal cations certain organic salt forming compounds which are especially desirable are those presenting the amidine structure

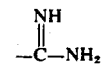

and the H— substituted forms thereof (e.g. acetamidine, guanidine, and isoureas) and tertiary amine salts such as are derived from piperidine, piperazine, pyrrolidine and imidazolidine.

The compounds of this invention may be produced by several methods. A direct route for preparation of an amidine salt is as follows:

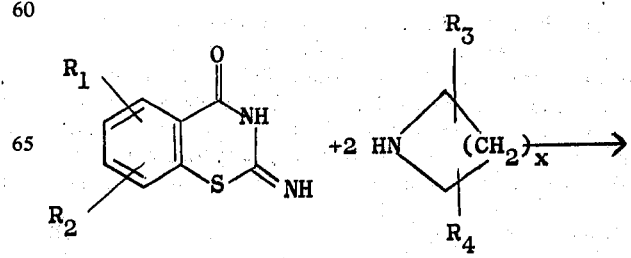

—Continued

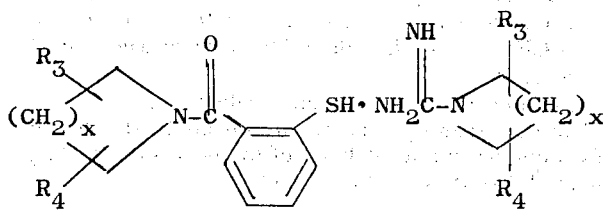

wherein the groups $R_1$, $R_2$, $R_3$ and $R_4$ and the values for $x$ are as described above. The reaction proceeds smoothly at the reflux temperature of the reactants when pyrrolidine itself is used as the reactant and solvent. However, any inert mutual solvent may be used as the reaction medium if desired. Furthermore, the reaction may be conducted at from ambient temperatures to the reflux temperature of the system, under elevated pressures if desired. Generally the practical temperature range for performance of the process lies between about 30°C. to about 150°C.

The process of this invention as described in the preceding paragraph affords a desirable method for preparing known and novel N-amidino derivatives from a 2-imino-1,3-benzothiazin-4-one by reaction with an amine to produce the amidine salt of the o-mercaptobenzoylamide from which the N-amidino derivative may be recovered by acidification and isolation from the amide by conventional procedures.

The compounds of this invention may also be produced by reacting the desired amine with an acid halide to prepare an amide followed by reduction of the dithioether linkage and preparation of a salt as follows:

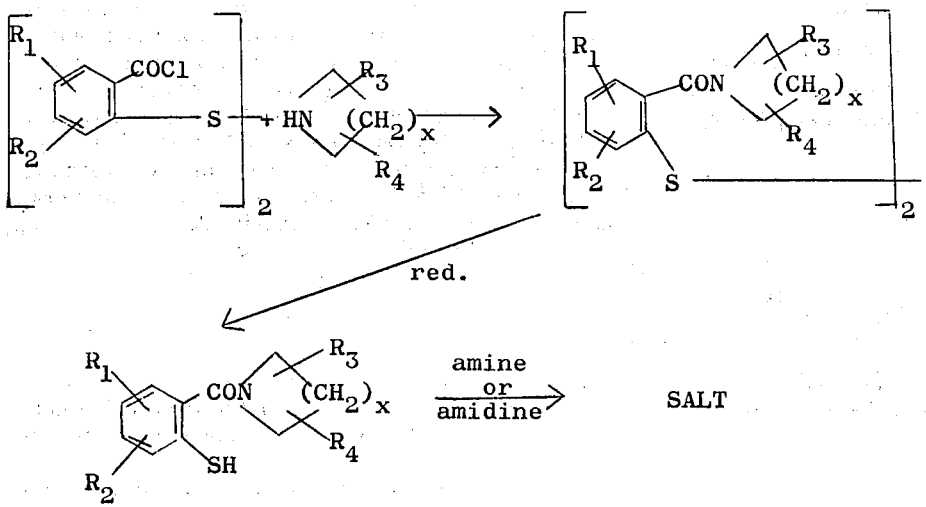

Amidine derivatives other than that depicted, e.g.

and the like, may be employed to produce the desired salts. Likewise, the alkali metals, alkaline earth metals, and transition metals form desirable salts with the ortho-mercaptobenzoyl amides of this invention. Various amines such as pyrrolidine, piperidine, piperazine, and the like, may be employed as the salt forming base. Thus, the sodium salt of 1-(ortho-mercaptobenzoyl)-pyrrolidine or the free mercaptan thereof may be converted to the piperazine salt by methods known to the art to provide a very desirable form of the compound for administration.

Recently, it has been established that at least one form of hyperglycemia is produced by reduced insulin B-chain albumin complex, the latter serving to block, in some unknown way, the function of insulin in vivo (Diabetes 17:1, 1968). This form of hyperglycemia seems to be more prevalent in the elderly, although it is not limited to any age group, and may be considered a chemically induced, maturity onset hyperglycemia.

Although applicants do not intend to be bound by any specific theory or mode of action, the hypoglycemic effect induced in a warm-blooded animal by the compounds of this invention is hypothesized to result from inhibition of insulin B-chain induced hyperglycemia. An especially beneficial response is obtained in cases involving maturity onset diabetes where a residual insulin producing ability still exists, the compounds of this invention preventing inhibition of insulin activity endogenously provided.

The hypoglycemic agents of this invention are administrable either orally or by the intramuscular route. The amount of the acitve compound needed to reduce blood sugar to acceptable levels varies with the mode of administration as well as with the weight of the individual under treatment and the unique response of the patient relative to age, level of blood sugar concentration and the latent or recoverable insulin producing capability of the patient.

The compounds of this invention appear to have no observable effect on insulin or other known hypoglycemic agents such as tolbutamide, chlorpropamide and phenformin and may supplement or be supplemented by other blood sugar lowering compounds to produce a desired effect. Likewise, a suitable adjuvant may be incorporated into the administered vehicle such as a diluent, lubricant, solvent, buffer, and the like.

The compounds of this invention are water soluble and directly administrable in aqueous solution. As solids, the compounds of this invention may be formulated into unit dosage form in typical combinations such as:

TABLET COMPOSITION (weight/weight)

| | |
|---|---|
| 1-(o-mercaptobenzoyl) pyrrolidine | (65%) |
| 1-(o-mercaptobenzoyl) pyrrolidine 1-pyrrolidine-carboxamidine salt | (35%) |
| Avicel (microcrystalline cellulose | 15–25% |
| Mg Stearate | 0.5% |
| Lactose | q.s.ad. 100% |

CAPSULE COMPOSITION (weight/weight)

| | |
|---|---|
| 1-(o-mercaptobenzoyl) pyrrolidine 1-pyrrolidine-carboxamidine salt | X% |
| Mg Stearate | 1–5% |
| Lactose or Talc | q.s.ad. 100% |

INJECTIBLE SOLUTIONS FOR VIALS (wt/vol)

| | |
|---|---|
| 1-(o-mercaptobenzoyl) pyrrolidine 1-pyrrolidine carboxamidine salt | X% |
| $NaOCOCH_3 \cdot HOCOCH_3$ buffer | |
| Anti-oxidant | 0.5–2.5% |
| $H_2O$ or Propyleneglycol | q.s.ad. 100% |

In the case of 1-(o-mercaptobenzoyl)-pyrrolidine, which is an oil, by either conversion to one of the various salt forms in whole, in part, or by forming a mixture of the oil and one of its salts, a white solid material for dry compounding may be produced.

The activity of the claimed compounds was initially determined by both in vitro and in vivo studies. Following the procedures reported in Biochemistry 5:461–466(1966) and Nature 213:515–516(1967), said articles being incorporated herein by reference. The hypoglycemic activity of the claimed compounds was established at oral dosage levels as low as 5 milligrams per kilogram body weight in rats for 1-(ortho-mercaptobenzoyl) pyrrolidine and its pyrrolidinecarboxamidine salt.

The in vitro testing was performed by preparing mitochondria from the livers of male Sprague-Dawley rats, (150–250 grams body weight) that had been fasted 18 hours, by a standardized differential centrifugation procedure. The effect of reduced insulin B-chain complexed with albumin (0.9 mg of each in 5 ml test system) on the inhibition of the mitochondrial swelling by insulin ($5 \times 10^{-6}$ moles) was determined in a Beckman Model B spectrophotometer at 520 m$\mu$. Insulin, reduced insulin B-chain and albumin were suspended in pH 7.3, 0.125 M KCl-0.02 M Tris-0.1% partially hydrolyzed gelatin buffer, so that the specified weight or molar concentration of these agents was contained in 5 ml of buffer. Compounds to be tested for their ability to block the B-chain inhibition were incorporated in the tubes containing the B-chain, albumin and insulin. The B-chain-albumin-insulin system was also run without the compound, and these same agents were also run by themselves. The solutions were placed in matched 15 × 100 mm test tubes and stock mitochondrial suspension was added to the 5 ml of KCl-Tris buffer in which they were contained to give an initial optical density of 0.49.–0.52. The same concentration of albumin was added to the tubes that did not contain any reagent as was present in the other tubes, and all experimental and control determinations were run in triplicate. The increased average change in optical density of the tubes containing insulin, reduced B-chain-albumin, and compound, above that of the tubes containing all of these reagents except the compound under study, served as a measure of activity of the compounds. The greater the optical density change within experimental limits and the lower and concentration of the compound necessary to produce this change the greater the activity of the compound. All compounds were studied initially at $7.5 \times 10^{-5}$M and an increase in optical density of $50 \times 10^{-3}$ at 10 minutes, $60 \times 10^{-3}$ at 20 minutes and $30 \times 10^{-3}$ at 30 minutes was considered to be the minimal requirement for activity.

The in vivo testing was performed with rats in a diabetic-like state, that had been maintained for 7 days on a high fat, high protein diet, to determine the effect of reduced insulin B-chain complexed with albumin in elevating the blood sugar levels. These rats are more sensitive to B-chain induced hyperglycemia and generate significantly elevated glucose levels.

After an 18 hour fast the rats were injected intraperitoneally with 1 mg of reduced B-chain complexed with an equal weight of albumin, or 1 mg of albumin alone. A second injection of either the same amount of reduced B-chain and albumin, or albumin alone was given 30 minutes later. Blood samples for blood sugar analysis were obtained before the first and second injections as well as 60 and 90 minutes after the first injection. Rapidly increasing glucose values over the control values were observed at the 30 and 60 minute time intervals with a slight fall off at 90 minutes. In assessing the activity of the drugs, after taking the control blood sample, the drug compound was administered orally, usually at 30 mg. per kg. After 30 minutes, to allow for absorption of the compound, the animal was given B-chain following the procedure described above.

The following examples are presented to illustrate the way in which compounds of this invention were prepared without intending to limit the tangible or intangible aspects of the invention.

EXAMPLE I 1-(o-Mercaptobenzoyl)pyrrolidine, salt with 1-pyrrolidinecarboxamidine.

2-Imino-1,3-benzothiazin-4-one (7.0 g., 0.0393 mole) is heated in refluxing pyrrolidine (100 ml.) for 2.5 hours and the excess pyrrolidine solvent is removed under vacuum. The residue is triturated with acetonitrile, to give white crystals (10.5 g), m.p. 187°–195°C. (uncorr.). Recrystallization of the crude solid from acetonitrile-dimethylformamide, gives white crystals (6.0 g., 48% yield), m.p. 193°–196°C. (uncorr.).

Elemental Analysis: $C_{11}H_{13}NOS \cdot C_5H_{11}N_3$ Calcd: C, 59.96; H, 7.55; N, 17.49; S, 10.01. Found: C, 59.93; H, 7.45; N, 16.97; S, 9.3.

EXAMPLE II 1,1'-[Dithiobis(o-phenylenecarbonyl)]dipyrrolidine

To dithiosalicyloyl dichloride (15.0 g., 0.0488 mole) dissolved in tetrahydrofuran (100 ml.), pyrrolidine (13.9 g., 0.195 mole) dissolved in tetrahydrofuran (25 ml.) is added dropwise over ½ hour. The solution is refluxed for ½ hour and the solvent is removed under vacuum. Water and methylene chloride are added and the methylene chloride layer is washed with dilute hydrochloric acid, dilute sodium hydroxide, water, saturated salt, and dried with sodium sulfate. Removal of the solvent gives a gum (14.0 g., 70% yield).

EXAMPLE III 1-(o-Mercaptobenzoyl)pyrrolidine 1,1'-[Dithiobis(o-phenylenecarbonyl)]dipyrrolidine (14.3 g., 0.0347 mole) is dissolved in absolute ethanol (100 ml.) at 65°–70°C. and a mixture of sodium borohydride (2.63 g., 0.0695 mole in absolute ethanol (75 ml.) is added to the solution, dropwise. The mixture is heated at 75°–80°C. for 1 hour and then poured into ice water (650 ml.) where the pH is brought to 11 with sodium hydroxide. The aqueous solution is washed with diethyl ether and cooled to 5°C. with ice. The pH is brought to 3 with hydrochloric acid under nitrogen and the solution is extracted twice with diethyl ether. The ether extract is washed twice with water, saturated salt, dried with sodium sulfate, and evaporated under vacuum, to give an oil (9.4 g., 65% yield). The oil is then distilled through a short path distillation column, b.p. 134°–137°C. at 5 × 10⁻⁴ mm Hg., absolute to yield the desired product.

Elemental Analysis: $C_{11}H_{13}NOS$ Calc'd: C, 63.73; H, 6.32; N, 6.76. Found: C, 63.35; H, 6.31; N, 7.01.

EXAMPLE IV 1-(o-Mercaptobenzoyl)pyrrolidine, ½ zinc salt

To a refluxing solution of 1,1'-[dithiobis(o-phenylenecarbonyl)]dipyrrolidine (13.1 g., 0.0317 mole) in glacial acetic acid (50 ml.) zinc dust (4.3 g.) is added in portions and the mixture is stirred and refluxed for ½ hour. The mixture is filtered and the solvent is removed under vacuum to yield an oil. The oil is triturated with ethanol, giving a white crystalline product (19 g.,), m.p. 228°–234°C. (uncorr.). The crude product is recrystallized from dimethylformamide and washed with ethanol to give white crystals (11.0 g., 72% yield), m.p. 238°–240.5°C. (uncorr.).

Elemental Analysis: $C_{11}H_{12}NOS \cdot \frac{1}{2} Zn$ Calc'd: C, 55.29; H, 5.06; N, 5.86. Found: C, 55.45; H, 5.37; N, 6.03.

EXAMPLE V 1-(o-Mercaptobenzoyl)pyrrolidine piperidine salt

A slight excess of the stoichiometric amount of piperidine is added to the product of Example III in diethylether. The precipitated salt is recovered by filtration and is washed with a small amount of ether to remove excess piperidine and afford the title compound in good yield.

EXAMPLE VI 1,1'-[Dithiobis(o-phenylenecarbonyl)]dipiperidine

To dithiosalicyloyl dichloride (11.4 g., 0.037 mole) dissolved in refluxing benzene (300 ml.), piperidine (12.6 g., 0.147 mole) dissolved in benzene (100 ml.) is added dropwise and the mixture is reacted and worked-up in the manner of Example I, to give a crude solid product (11.6 g., 71% yield), m.p. 145°–147°C. (uncorr.). The solid is recrystallized from acetonitrile to afford white crystals (9.5 g.), m.p. 148°–150°C. (uncorr.).

Elemental Analysis: $C_{24}H_{28}N_2O_2S_2$ Calc'd: C, 65.42; H, 6.40; N, 6.36. Found: C, 65.20; H, 6.25; N, 6.53.

EXAMPLE VII 1-(o-Mercaptobenzoyl)piperidine 1,1'[Dithiobis(o-phenylenecarbonyl)]dipiperidine (5.8 g., 0.0132 mole) is stirred at 65°–70°C. in absolute ethanol (55 ml.) and a solution of sodium borohydride (1.0 g., 0.026 mole) in absolute ethanol (35 ml.) is added dropwise. The mixture is heated at 75°–80°C. for 1 hour, poured into ice water (500 ml.), and the pH is adjusted to 11 with sodium hydroxide. The aqueous solution is washed with diethyl ether and cooled to 5°C. with ice. The pH is lowered to 3 with hydrochloric acid under nitrogen and the solution is extracted twice with diethyl ether. The ether layer is washed twice with water, saturated salt solution, dried with sodium sulfate, and evaporated under vacuum, to give an oil that crystallizes on standing (4.9 g., 84% yield), m.p. 66.5°–69°C. (uncorr.). The crude solid is recrystallized from hexane to afford a white crystalline product, m.p. 68.5°–70°C. (uncorr.).

Elemental Analysis: $C_{12}H_{15}NOS$ Calc'd: C, 65.12; H, 6.83; N, 6.33. Found: C, 65.03; H, 6.72; N, 6.47.

EXAMPLE VIII

1-Pyrrolidinecarboxamidine

An aqueous solution of 1-(o-mercaptobenzoyl)pyrrolidine, 1-pyrrolidinecarboxamidine salt is acidified with hydrochloric acid to a pH of about 4 (congo red) and then extracted with methylene chloride. The aqueous phase contains the hydrochloride salt of 1-pyrrolidinecarboxamidine which is recovered by stripping the water under vacuum to leave the salt as a residue.

If desired, the free base is readily obtained by neutralization of the hydrochloric acid. The nitrate and sulfate salts are obtained in analogous manner.

EXAMPLE IX 1-(o-mercaptobenzoyl)pyrrolidine, salt with piperazine 1-(o-mercaptobenzoyl)pyrrolidine (8.9 g., 0.043 mole) is dissolved in 50 ml. of ethyl acetate and the soltuion is added to a solution of piperazine dropwise (1.85 g., 0.0215 mole) in 50 ml. ethyl acetate over a 5 minute period. The resulting mixture is heated to boiling and 200 ml. ethyl acetate is added. The resulting solution is filtered and the filtrate is cooled to give 5.62 g. of white crystals, m.p. 135°–139°C.

Elemental Analysis: $C_{15}H_{23}N_3OS$ Calc'd; C, 61.41; H, 7.90; N, 14.33; S, 10.93. Found: C, 61.34; H, 8.06; N, 14.81; S, 11.42.

What is claimed is:

1. A method for reducing the blood sugar level in a hyperglycemic, warm-blooded animal which comprises administering, orally or intramuscularly, in an amount sufficient to reduce said blood sugar level, a compound of the formula

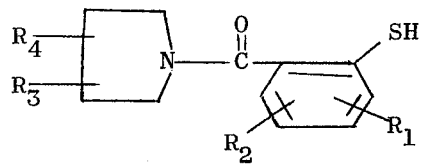

in which:
R₁ and R₂ are members independently selected from the group consisting of —H, alkyl of 1 to 6 carbon atoms, alkoxy of 1 to 6 carbon atoms, —F, —Cl, —Br, —I, dialkylamino in which each alkyl group has from 1 to 6 carbon atoms, —OH, —SH, —NO₂ and alkylthio having from 1 to 6 carbon atoms;
R₃ and R₄ are members independently selected from the group consisting of —H, alkyl of 1 to 6 carbon atoms, alkoxy of 1 to 6 carbon atoms, —F, —Cl, —Br, —I and dialkylamino in which each alkyl group has from 1 to 6 carbon atoms;

or a pharmaceutically acceptable salt thereof.

2. The method of claim 1 in which said pharmaceutically acceptable salt is 1-pyrrolidinecarboxamidine.

3. The method of claim 1 in which said compound is 1-(o-mercaptobenzoyl)-pyrrolidine, 1-pyrrolidinecarboxamidine.

4. The method of claim 1 in which said compound is [1-(o-mercaptobenzoyl)pyrrolidine]$_2$Zn.

5. The method of claim 1 in which said compound is 1-(o-mercaptobenzoyl)pyrrolidine piperidine salt.

6. The method of claim 1 in which said compound is 1-(o-mercaptobenzoyl)pyrrolidine piperazine salt.

7. A pharmaceutical composition for treatment of hyperglycemic, warm-blooded animals, comprising as the essential active ingredient an effective amount of a compound of the formula:

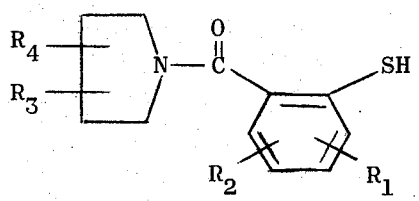

in which:
R$_1$ and R$_2$ are members independently selected from the group consisting of —H, alkyl of 1 to 6 carbon atoms, alkoxy of 1 to 6 carbon atoms, —F, —Cl, —Br, —I, dialkylamino in which each alkyl group has from 1 to 6 carbon atoms, —OH, —SH, —NO$_2$ and alkylthio having from 1 to 6 carbon atoms;

R$_3$ and R$_4$ are members independently selected from the group consisting of —H, alkyl of 1 to 6 carbon atoms, alkoxy of 1 to 6 carbon atoms, —F, —Cl, —Br, —I and dialkylamino in which each alkyl group has from 1 to 6 carbon atoms;

or a pharmaceutically acceptable salt thereof, in combination with an adjuvant which is chemically inert toward said active ingredient.

8. The composition of claim 7 in which said active ingredient is 1-(o-mercaptobenzoyl)pyrrolidine, 1-pyrrolidinecarboxamidine salt.

9. The composition of claim 7 in which said active ingredient is 1-(o-mercaptobenzoyl)pyrrolidine piperidine salt.

10. The composition of claim 7 in which said active ingredient is 1-(o-mercaptobenzoyl)pyrrolidine piperazine salt.

* * * * *